(12) United States Patent
Newton et al.

(10) Patent No.: US 11,310,486 B2
(45) Date of Patent: *Apr. 19, 2022

(54) METHOD AND APPARATUS FOR COMBINING 3D IMAGE AND GRAPHICAL DATA

(71) Applicant: KONINKLIJKE PHILIPS N.V., Eindhoven (NL)

(72) Inventors: Philip Steven Newton, Eindhoven (NL); Geradus Wilhelmus Theodorus Van Der Heijden, Eindhoven (NL); Wiebe De Haan, Eindhoven (NL); Johan Cornelis Talstra, Eindhoven (NL); Wilhelmus Hendrikus Alfonsus Bruls, Eindhoven (NL); Georgios Parlantzas, Aachen (DE); Marc Helbing, Aaachen (DE); Christian Benien, Aachen (DE); Vasanth Philomin, Stolberg (DE); Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 690 days.

This patent is subject to a terminal disclaimer.

(21) Appl. No.: 15/227,295

(22) Filed: Aug. 3, 2016

(65) Prior Publication Data
US 2017/0013255 A1   Jan. 12, 2017

Related U.S. Application Data

(63) Continuation of application No. 13/201,736, filed as application No. PCT/IB2010/050574 on Feb. 9, 2010, now Pat. No. 9,438,879.
(Continued)

(30) Foreign Application Priority Data
Feb. 17, 2009  (EP) .................................... 09152988

(51) Int. Cl.
*H04N 13/361* (2018.01)
*H04N 13/183* (2018.01)
(Continued)

(52) U.S. Cl.
CPC ......... *H04N 13/361* (2018.05); *H04N 13/122* (2018.05); *H04N 13/139* (2018.05); *H04N 13/183* (2018.05); *H04N 13/293* (2018.05)

(58) Field of Classification Search
CPC ........... H04N 13/0018; H04N 13/0029; H04N 13/007; H04N 13/0292; H04N 13/0456
(Continued)

(56) References Cited

U.S. PATENT DOCUMENTS 5,047,864 A   9/1991 Fujito
5,699,123 A   12/1997 Ebihara et al.
(Continued)

FOREIGN PATENT DOCUMENTS

EP   1418766 A2   5/2004
EP   1523175 A1   4/2005
(Continued)

OTHER PUBLICATIONS

Fehn, Christoph Depth Image Based Rendering (DIBR) Compression and Transmission for a New Approach on 3DTV, Information Society Technologies, Program No. IST-2001-34396 2004.
(Continued)

*Primary Examiner* — Francis Geroleo (57) ABSTRACT

Three dimensional [3D] image data and auxiliary graphical data are combined for rendering on a 3D display (30) by detecting depth values occurring in the 3D image data, and setting auxiliary depth values for the auxiliary graphical data (31) adaptively in dependence of the detected depth values. The 3D image data and the auxiliary graphical data at the auxiliary depth value are combined based on the depth
(Continued)

values of the 3D image data. First an area of attention (32) in the 3D image data is detected. A depth pattern for the area of attention is determined, and the auxiliary depth values are set in dependence of the depth pattern.

11 Claims, 9 Drawing Sheets

Related U.S. Application Data (60) Provisional application No. 61/222,396, filed on Jul. 1, 2009.

(51) Int. Cl.
  *H04N 13/293* (2018.01)
  *H04N 13/122* (2018.01)
  *H04N 13/139* (2018.01)

(58) Field of Classification Search
  USPC .......................................................... 348/43
  See application file for complete search history.

(56) References Cited

U.S. PATENT DOCUMENTS

| | | | |
|---|---|---|---|
| 8,508,579 B2 | 8/2013 | Lee | |
| 9,013,551 B2* | 4/2015 | Zhang | H04N 13/183 348/46 |
| 2002/0008906 A1 | 1/2002 | Tomita | |
| 2003/0189669 A1 | 10/2003 | Bowser | |
| 2007/0003221 A1 | 1/2007 | Hamada et al. | |
| 2007/0022435 A1 | 1/2007 | Kwon | |
| 2007/0296866 A1* | 12/2007 | Fujisawa | H04N 5/14 348/571 |
| 2009/0142041 A1* | 6/2009 | Nagasawa | H04N 13/0033 386/341 |
| 2010/0142924 A1 | 6/2010 | Yamashita et al. | |
| 2010/0238267 A1* | 9/2010 | Izzat | H04N 13/183 348/43 |
| 2010/0245345 A1 | 9/2010 | Tomisawa et al. | |
| 2010/0292002 A1 | 11/2010 | Ward | |
| 2011/0013888 A1* | 1/2011 | Sasaki | G11B 27/034 386/353 |

FOREIGN PATENT DOCUMENTS

| | | |
|---|---|---|
| JP | 10217590 A | 8/1998 |
| JP | 2004274125 A | 9/2004 |
| JP | 2009005259 A | 1/2009 |
| WO | 20046988 A2 | 8/2000 |
| WO | 200116868 A1 | 3/2001 |
| WO | 2006136989 A1 | 12/2006 |
| WO | 2008038205 A2 | 4/2008 |
| WO | 2008044191 A2 | 4/2008 |
| WO | 2008115222 A1 | 9/2008 |
| WO | 2009031872 A2 | 3/2009 |

OTHER PUBLICATIONS

White Paper Blu-Ray Disc Format, 2.B Audio Visual Application Format Specifications for BD-ROM. Mar. 2005. pp. 1-35.

Application Definition Blu-Ray Disc Format, BD-J Baseline Application and Logical Model Definition for BD-ROM, Mar. 2005, pp. 1-45.

Kim, HanSung et al. "Hierarchical Depth Estimation for Image Synthesis in Mixed Reality" Proceedings of the SPIE, vol. 5006, Jan. 21, 2003, pp. 545-552.

* cited by examiner

METHOD AND APPARATUS FOR COMBINING 3D IMAGE AND GRAPHICAL DATA

CROSS-REFERENCE TO PRIOR APPLICATIONS

This application claims the benefit or priority of and describes relationships between the following applications: wherein this application is a continuation of U.S. patent application Ser. No. 13/201,736, filed Aug. 16, 2011, which is the National Stage of International Application No. PCT/IB2010/050574, filed Feb. 9, 2010, which claims the priority of foreign application EP09152988.3 filed Feb. 17, 2009 and U.S. provisional application 61/222,396 filed Jul. 1, 2009, all of which are incorporated herein in whole by reference.

FIELD OF THE INVENTION

The invention relates to a method of combining three dimensional [3D] image data and auxiliary graphical data, the method comprising detecting depth values occurring in the 3D image data, and setting auxiliary depth values for the auxiliary graphical data adaptively in dependence of the detected depth values for generating a 3D display signal for rendering the image content on a display area by combining the 3D image data and the auxiliary graphical data based on the auxiliary depth values.

The invention further relates to a 3D source device, a 3D display device and a computer program product.

The invention relates to the field of rendering 3D image data, e.g. 3D video in combination with auxiliary graphical data such as subtitles or logos, on a 3D display device such that the 3D image data does not occlude the auxiliary graphical data.

BACKGROUND OF THE INVENTION

Devices for sourcing 2D video data are known, for example video players like DVD players or set top boxes which provide digital video signals. The source device is to be coupled to a display device like a TV set or monitor. Image data is transferred from the source device via a suitable interface, preferably a high-speed digital interface like HDMI. Currently 3D enhanced devices for sourcing three dimensional (3D) image data are being proposed. Similarly devices for display 3D image data are being proposed.

For 3D content, such as 3D movies or TV broadcasts, additional, auxiliary graphical data may be displayed in combination with the image data, for example subtitles, a logo, a game score, a ticker tape for financial news or other announcements or news.

The document WO2008/115222 describes a system for combining text with three dimensional content. The system inserts text at the same level as the highest depth value in the 3D content. One example of 3D content is a two-dimensional image and an associated depth map. In this case, the depth value of the inserted text is adjusted to match the largest depth value of the given depth map. Another example of 3D content is a plurality of two-dimensional images and associated depth maps. In this case, the depth value of the inserted text is continuously adjusted to match the largest depth value of a given depth map. A further example of 3D content is stereoscopic content having a right eye image and a left eye image. In this case the text in one of the left eye image and right eye image is shifted to match the largest depth value in the stereoscopic image. Yet another example of 3D content is stereoscopic content having a plurality of right eye images and left eye images. In this case the text in one of the left eye images or right eye images is continuously shifted to match the largest depth value in the stereoscopic images. As a result, the system produces text combined with 3D content wherein the text does not obstruct the 3D effects in the 3D content and does not create visual fatigue when viewed by a viewer.

SUMMARY OF THE INVENTION

The document WO2008/115222 describes that the auxiliary graphical data is to be displayed in front of the closest part of the image data. A problem that occurs with current systems is that the subtitle tends to be very close to the viewer. We have found that viewers in practice do not appreciate the close position of subtitles. With some current 3D displays, the image properties tend to decrease for objects that are displayed before the screen and closer to the viewer. For any stereo display close objects give more eye-strain.

It is an object of the invention to provide a system for combining the auxiliary graphical data and 3D content in a more convenient way on a display device.

For this purpose, according to a first aspect of the invention, in the method as described in the opening paragraph, detecting the depth values comprises detecting an area of attention in the 3D image data and determining a depth pattern for the area of attention, and setting the auxiliary depth values comprises setting the auxiliary depth values in dependence of the depth pattern.

For this purpose, according to a second aspect of the invention, the 3D source device for combining three dimensional image data and auxiliary graphical data as described in the opening paragraph, comprises 3D image processing means for detecting depth values occurring in the 3D image data, and setting auxiliary depth values for the auxiliary graphical data adaptively in dependence of the detected depth values for generating a 3D display signal for rendering the image content on a display area by combining the 3D image data and the auxiliary graphical data based on the auxiliary depth values, wherein the 3D image processing means are arranged for detecting the depth values comprises detecting an area of attention in the 3D image data and determining a depth pattern for the area of attention, and setting the auxiliary depth values comprises setting the auxiliary depth values in dependence of the depth pattern.

For this purpose, according to a further aspect of the invention, the 3D display device for combining three dimensional image data and auxiliary graphical data as described in the opening paragraph, comprises a 3D display for displaying 3D image data, and 3D image processing means for detecting depth values occurring in the 3D image data, and setting auxiliary depth values for the auxiliary graphical data adaptively in dependence of the detected depth values for generating a 3D display signal for rendering the image content on a display area by combining the 3D image data and the auxiliary graphical data based on the auxiliary depth values, wherein the 3D image processing means are arranged for detecting the depth values comprises detecting an area of attention in the 3D image data and determining a depth pattern for the area of attention, and setting the auxiliary depth values comprises setting the auxiliary depth values in dependence of the depth pattern.

The measures have the effect that the detecting of the area of attention enables the system to establish on which elements the viewers attention will be directed when the viewer is assumed to observe the auxiliary data. Detecting depth values occurring in the 3D image data means calculating such values from left and right image in a left/right 3D format, or using the depth data from a 2D+depth stream, or deriving such depth values from any other 3D image format like a Left+Right+Depth stream. The depth pattern is determined for the detected area of attention. The system specifically sets the auxiliary depth values in dependence of the depth pattern, e.g. substantially at the same depth as the area of attention or in front of an area of attention where no other objects are located close to the user. In the area of displaying the auxiliary graphical data that the 3D image data does not occlude the auxiliary graphical data, i.e. does not contain any image data on a more forward position. It is to be noted that in other areas of the 3D image content further objects may have a more forward position, i.e. be closer to the user. Advantageously a viewer will not have to disturbing effects in the depth perception of the elements he is viewing and does not have to substantially adjust the depth of focus when he switches between observing the auxiliary graphical data and the area of attention.

The invention is also based on the following recognition. The prior art document describes positioning the text at a depth before the closest element in the image. The inventors have seen that such positioning pushes the text forward by any element displayed close to the user. The forward position of the text causes fatigue and is perceived as unpleasant. The current system provides a more backward position of the auxiliary graphical data, which is more complex to create but appreciated by the viewers. Typically the auxiliary graphical information is positioned less forward than the closest object, but also at or before the screen surface. Generally the image quality and sharpness is optimal at the screen surface, but this may depend on the type of display and the subject and size of the auxiliary graphical data.

In an embodiment of the system detecting an area of attention comprises detecting an object of attention in the 3D image data, and the depth pattern is based on depth values of the object. The object of attention is the object on which the attention of the viewer is to be focused, e.g. a speaker in a talk show or a main character acting in a scene. The effect is that the depth position of the object of attention determines the depth position of the auxiliary graphical data. Advantageously the viewer does not have to change the focus of his eyes when switching to reading the auxiliary graphical data.

In an embodiment of the system the detecting the area of attention comprises selecting a target region for positioning the auxiliary graphical data, and the depth pattern is based on depth values of the target region. The effect is that the auxiliary data, when located in the target region, is positioned at a depth which is in proportion to the depth pattern of the surrounding target region. It is to be noted that in other regions of the display area objects may have a more forward position than the auxiliary graphical data. Advantageously the area of the target region is selected such that, in the location of the auxiliary graphical data, no objects are more forward, while objects in the display area farther away from said location are more forward.

Specifically, in a further embodiment of the system, the selecting the target region comprises subdividing the display area in multiple regions, and detecting the depth pattern is based on spatially filtering the depth values of the multiple regions according to a spatial filter function in dependence of the target region. The effect is that the spatial filtering applies a relative weight to the various forward objects depending on their distance to the target area.

Specifically, in a further embodiment of the system, selecting the target region comprises at least one of selecting, as the target region, a region of the image data where no depth values occur larger than the auxiliary depth values; selecting a period in time for displaying the auxiliary data such that, in the target region, no depth values occur larger than the auxiliary depth values; selecting, as the target region, an area of the display where no image data is displayed, and accordingly reducing the size of the image data to fit in the remaining display area. The effect is that the location and/or appearance of the auxiliary graphical data are adjusted according to the actual 3D image data, i.e. where and when the auxiliary graphical data is displayed depends on the content displayed.

In an embodiment of the system the determining the depth pattern comprises detecting depth values in multiple frames of video content, and temporally filtering the depth values according to a temporal filter function. The effect is, that the temporal filtering smoothens depth differences of elements moving or (dis)appearing in the 3D image data. Advantageously the auxiliary depth value is adjusted in time in a controlled way.

Further preferred embodiments of the method, 3D devices and signal according to the invention are given in the appended claims, disclosure of which is incorporated herein by reference.

It is a further object of the present invention to provide a method of combining three dimensional [3D] image data and auxiliary graphical data, the method comprising obtaining scaling and/or shifting information for use with the threedimensional [3D] image data, scaling and/or shifting the three dimensional [3D] image data in accordance with the scaling and/or shifting information respectively combining the scaled and/or shifted three dimensional [3D] image data and the auxiliary graphical data such that at least part of the auxiliary graphical data is placed within a spatial area defined by the three dimensional [3D] image data which is not occupied by the scaled and/or shifted three dimensional [3D] image data. Furthermore the present invention provides a 3D source device according to claim 10, a 3D display device according to claim 11 and a digital information carrier according to claim 12.

BRIEF DESCRIPTION OF THE DRAWINGS

These and other aspects of the invention will be apparent from and elucidated further with reference to the embodiments described by way of example in the following description and with reference to the accompanying drawings, in which.

In the Figures, elements which correspond to elements already described have the same reference numerals.

DETAILED DESCRIPTION OF EMBODIMENTS

Figure 1:
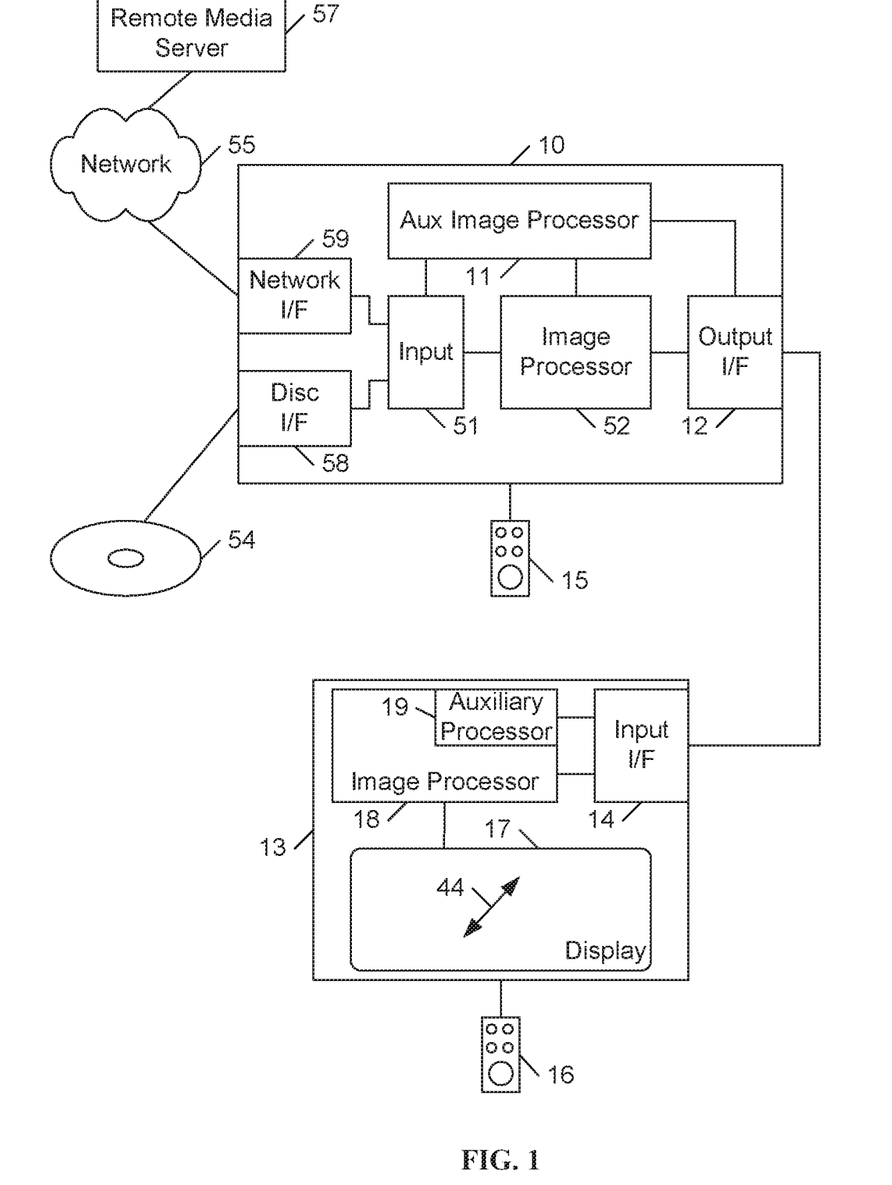
FIG. 1 shows a system for displaying three dimensional (3D) image data.

FIG. 1 shows a system for displaying three dimensional (3D) image data, such as video, graphics or other visual information. A 3D source device 10 is coupled to a 3D display device 13 for transferring a 3D display signal 56. The 3D source device has an input unit 51 for receiving image information. For example the input unit device may include an optical disc unit 58 for retrieving various types of image information from an optical record carrier 54 like a DVD or BluRay disc. Alternatively, the input unit may include a network interface unit 59 for coupling to a network 55, for example the internet or a broadcast network, such device usually being called a set-top box. Image data may be retrieved from a remote media server 57. The source device may also be a satellite receiver, or a media server directly providing the display signals, i.e. any suitable device that outputs a 3D display signal to be directly coupled to a display unit.

The 3D source device has an image processing unit 52 coupled to the input unit 51 for processing the image information for generating a 3D display signal 56 to be transferred via an output interface unit 12 to the display device. The processing unit 52 is arranged for generating the image data included in the 3D display signal 56 for display on the display device 13. The source device is provided with user control elements 15, for controlling display parameters of the image data, such as contrast or color parameter. The user control elements as such are well known, and may include a remote control unit having various buttons and/or cursor control functions to control the various functions of the 3D source device, such as playback and recording functions, and for setting said display parameters, e.g. via a graphical user interface and/or menus.

The source device has an auxiliary image processing unit 11 for processing auxiliary graphical data to be combined with the 3D image data on the 3D display. Auxiliary graphical data may be any additional image data that is to be combined with 3D image content, such as subtitles, a logo of a broadcaster, a menu or system message, error codes, news flashes, ticker tape, etc. In the text below usually subtitle will be used as indicative for every type of auxiliary graphical data. The 3D image processing means 11,52 are arranged for the following functions. First the depth values occurring in the 3D image data are detected. Based thereon, auxiliary depth values for the auxiliary graphical data are set adaptively in dependence of the detected depth values. Subsequently a 3D display signal 56 is generated for rendering the image content on a display area on a 3D display. Thereto the 3D image data and the auxiliary graphical data are combined based on the auxiliary depth values. The 3D image processing means are arranged for detecting the depth values as follows. An area of attention in the 3D image data is detected where the viewer is expected to have his/her attention focused on while the auxiliary graphical data is to be displayed. The area of attention may be an area where the auxiliary information is to be displayed, or the area near the auxiliary data display area, or any object or element elsewhere in the image that is determined to be the element on which the viewer's eyes will be focused.

Subsequently a depth pattern is determined for the area of attention, i.e. a set of depth values for the area of attention. For example the maximum and minimum values occurring in said area may be determined, and the depth pattern may be the average. Also a depth pattern occurring in time may be determined. Further details are elucidated below. Based on the depth pattern of the area of attention, the auxiliary depth values are set, for example at the same value of the above mentioned average depth value of the depth pattern, or before any elements of the 3D image data locally occurring in the auxiliary display area. Further examples of spatially or temporal filtering of the image data are given below.

The 3D display device 13 is for displaying 3D image data. The device has an input interface unit 14 for receiving the 3D display signal 56 including the 3D image data and the auxiliary graphical data transferred from the source device 10. The display device is provided with further user control elements 16, for setting display parameters of the display, such as contrast, color or depth parameters. The transferred image data is processed in image processing unit 18 according to the setting commands from the user control elements and generating display control signals for rendering the 3D image data on the 3D display based on the 3D image data. The device has a 3D display 17 receiving the display control signals for displaying the processed image data, for example a dual or lenticular LCD. The display device 13 may be any type of stereoscopic display, also called 3D display, and has a display depth range indicated by arrow 44. The auxiliary graphical data, with the auxiliary depth values and, if necessary, further display data like the x,y position, is retrieved from the display signal and combined with the 3D image data on the display 17.

Alternatively the processing for positioning the auxiliary graphical data is performed in the display device. The 3D image data and the auxiliary graphical data are transferred via the display signal 56, and the display device has an auxiliary processing unit 19. The auxiliary image processing unit 19 processes the auxiliary graphical data to be combined with the 3D image data on the 3D display. The 3D image processing means 19,18 are arranged for the corresponding functions as described above for the 3D image processing means 11,52 in the source device. In a further embodiment the source device and the display device are combined in a single device, where a single set of 3D image processing means performs said functions.

FIG. 1 further shows the record carrier 54 as a carrier of the 3D image data. The record carrier is disc-shaped and has a track and a central hole. The track, constituted by a series of physically detectable marks, is arranged in accordance with a spiral or concentric pattern of turns constituting substantially parallel tracks on an information layer. The record carrier may be optically readable, called an optical disc, e.g. a CD, DVD or BD (Blue-ray Disc). The information is represented on the information layer by the optically detectable marks along the track, e.g. pits and lands. The track structure also comprises position information, e.g. headers and addresses, for indication the location of units of information, usually called information blocks. The record carrier 54 carries information representing digitally encoded image data like video, for example encoded according to the MPEG2 or MPEG4 encoding system, in a predefined recording format like the DVD or BD format.

The following section provides an overview of three-dimensional displays and perception of depth by humans.

3D displays differ from 2D displays in the sense that they can provide a more vivid perception of depth. This is achieved because they provide more depth cues then 2D displays which can only show monocular depth cues and cues based on motion.

Monocular (or static) depth cues can be obtained from a static image using a single eye. Painters often use monocular cues to create a sense of depth in their paintings. These cues include relative size, height relative to the horizon, occlusion, perspective, texture gradients, and lighting/shadows. Oculomotor cues are depth cues derived from tension in the muscles of a viewers eyes. The eyes have muscles for rotating the eyes as well as for stretching the eye lens. The stretching and relaxing of the eye lens is called accommodation and is done when focusing on an image. The amount of stretching or relaxing of the lens muscles provides a cue for how far or close an object is. Rotation of the eyes is done such that both eyes focus on the same object, which is called convergence. Finally motion parallax is the effect that objects close to a viewer appear to move faster than objects further away.

Binocular disparity is a depth cue which is derived from the fact that both our eyes see a slightly different image. Monocular depth cues can be and are used in any 2D visual display type. To re-create binocular disparity in a display requires that the display can segment the view for the left- and right eye such that each sees a slightly different image on the display. Displays that can re-create binocular disparity are special displays which we will refer to as 3D or stereoscopic displays. The 3D displays are able to display images along a depth dimension actually perceived by the human eyes, called a 3D display having display depth range in this document. Hence 3D displays provide a different view to the left- and right eye.

3D displays which can provide two different views have been around for a long time. Most of these were based on using glasses to separate the left- and right eye view. Now with the advancement of display technology new displays have entered the market which can provide a stereo view without using glasses. These displays are called auto-stereoscopic displays.

A first approach is based on LCD displays that allow the user to see stereo video without glasses. These are based on either of two techniques, the lenticular screen and the barrier displays. With the lenticular display, the LCD is covered by a sheet of lenticular lenses. These lenses diffract the light from the display such that the left- and right eye receive light from different pixels. This allows two different images one for the left- and one for the right eye view to be displayed.

An alternative to the lenticular screen is the Barrier display, which uses a parallax barrier behind the LCD and in front the backlight to separate the light from pixels in the LCD. The barrier is such that from a set position in front of the screen, the left eye sees different pixels then the right eye. The barrier may also be between the LCD and the human viewer so that pixels in a row of the display alternately are visible by the left and right eye. A problem with the barrier display is loss in brightness and resolution but also a very narrow viewing angle. This makes it less attractive as a living room TV compared to the lenticular screen, which for example has 9 views and multiple viewing zones.

A further approach is still based on using shutter-glasses in combination with high-resolution beamers that can display frames at a high refresh rate (e.g. 120 Hz). The high refresh rate is required because with the shutter glasses method the left and right eye view are alternately displayed. For the viewer wearing the glasses perceives stereo video at 60 Hz. The shutter-glasses method allows for a high quality video and great level of depth.

The auto stereoscopic displays and the shutter glasses method do both suffer from accommodation-convergence mismatch. This does limit the amount of depth and the time that can be comfortable viewed using these devices. There are other display technologies, such as holographic- and volumetric displays, which do not suffer from this problem. It is noted that the current invention may be used for any type of 3D display that has a depth range.

Image data for the 3D displays is assumed to be available as electronic, usually digital, data. The current invention relates to such image data and manipulates the image data in the digital domain. The image data, when transferred from a source, may already contain 3D information, e.g. by using dual cameras, or a dedicated preprocessing system may be involved to (re-)create the 3D information from 2D images. Image data may be static like slides, or may include moving video like movies. Other image data, usually called graphical data, may be available as stored objects or generated on the fly as required by an application. For example user control information like menus, navigation items or text and help annotations may be added to other image data.

There are many different ways in which stereo images may be formatted, called a 3D image format. Some formats are based on using a 2D channel to also carry the stereo information. For example the left and right view can be interlaced or can be placed side by side and above and under. These methods sacrifice resolution to carry the stereo information. Another option is to sacrifice color, this approach is called anaglyphic stereo. Anaglyphic stereo uses spectral multiplexing which is based on displaying two separate, overlaid images in complementary colors. By using glasses with colored filters each eye only sees the image of the same color as of the filter in front of that eye. So for example the right eye only sees the red image and the left eye only the green image.

A different 3D format is based on two views using a 2D image and an additional depth image, a so called depth map, which conveys information about the depth of objects in the 2D image. The format called image+depth is different in that it is a combination of a 2D image with a so called "depth", or disparity map. This is a gray scale image, whereby the gray scale value of a pixel indicates the amount of disparity (or depth in case of a depth map) for the corresponding pixel in the associated 2D image. The display device uses the disparity, depth or parallax map to calculate the additional views taking the 2D image as input. This may be done in a variety of ways, in the simplest form it is a matter of shifting pixels to the left or right dependent on the disparity value associated to those pixels. The paper entitled "Depth image based rendering, compression and transmission for a new approach on 3D TV" by Christoph Fehn gives an excellent overview of the technology (see http://iphome.hhi.de/fehn/Publications/fehn_EI2004.pdf).

Figure 2:
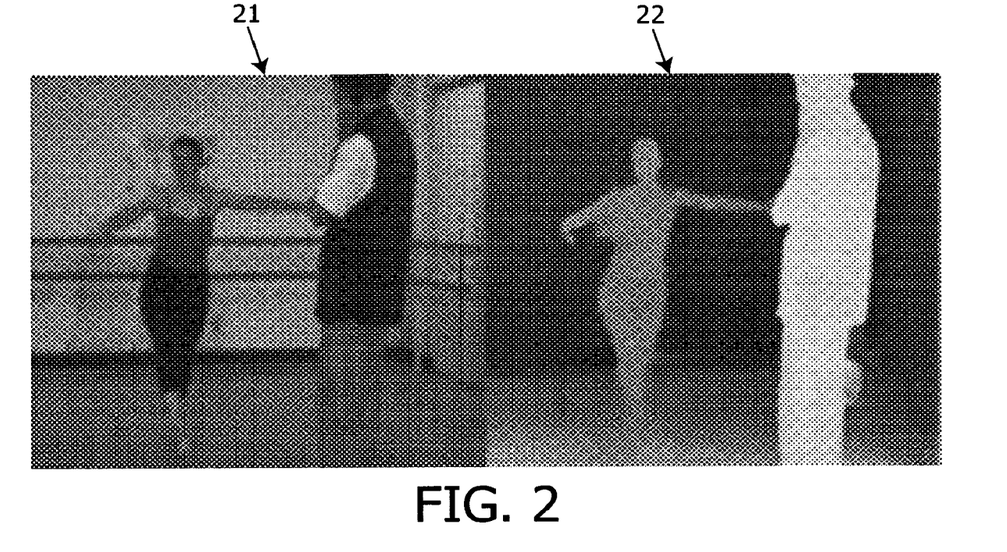
FIG. 2 shows an example of 3D image data.

FIG. 2 shows an example of 3D image data. The left part of the image data is a 2D image 21, usually in color, and the right part of the image data is a depth map 22. The 2D image information may be represented in any suitable image format. The depth map information may be an additional data stream having a depth value for each pixel, possibly at a reduced resolution compared to the 2D image. In the depth map grey scale values indicate the depth of the associated pixel in the 2D image. White indicates close to the viewer, and black indicates a large depth far from the viewer. A 3D display can calculate the additional view required for stereo by using the depth value from the depth map and by calculating required pixel transformations. Occlusions may be solved using estimation or hole filling techniques. Additional frames may be included in the data stream, e.g. further added to the image and depth map format, like an occlusion map, a parallax map and/or a transparency map for transparent objects moving in front of a background.

Adding stereo to video also impacts the format of the video when it is sent from a player device, such as a Blu-ray disc player, to a stereo display. In the 2D case only a 2D video stream is sent (decoded picture data). With stereo video this increases as now a second stream must be sent containing the second view (for stereo) or a depth map. This could double the required bitrate on the electrical interface. A different approach is to sacrifice resolution and format the stream such that the second view or the depth map are interlaced or placed side by side with the 2D video.

FIG. 2 shows an example of 2D data and a depth map. The depth display parameters that are sent to the display allow the display to correctly interpret the depth information. Examples of including additional information in video are described in the ISO standard 23002-3 "Representation of auxiliary video and supplemental information" (e.g. see ISO/IEC JTC1/SC29/WG11 N8259 of July 2007). Depending on the type of auxiliary stream the additional image data consists either of 4 or two parameters. A parameter in the display signal may indicate or change the 3D video transfer format.

In an embodiment said detecting an area of attention comprises detecting an object of attention in the 3D image data. Subsequently the depth pattern is based on depth values of the object. It is noted that placing the subtitles always at screen depth would cause some problems when viewing. When an object is at screen depth, an auto stereoscopic display shows it at highest resolution. Resolution will decrease if an object is displayed either in-front-of or behind the display surface. For glasses based, stereoscopic displays, screen depth might also be the best depth since then the point where the eyes focus is at the same location as the point of eye convergence. Nevertheless, screen depth appears not to be the best placement since subtitles are always viewed in conjunction with the corresponding 3D image content. This means that it may be uncomfortable for a viewer to alternate between subtitles and object when the object of attention in the 3D video does not lie at screen depth but the subtitles do. Hence the depth of the subtitles is set at the same depth as the object of attention. For instance, the speaking actor who is likely the object of attention will serve as a reference element, and its depth will be taken and used for the subtitles.

Figure 3:
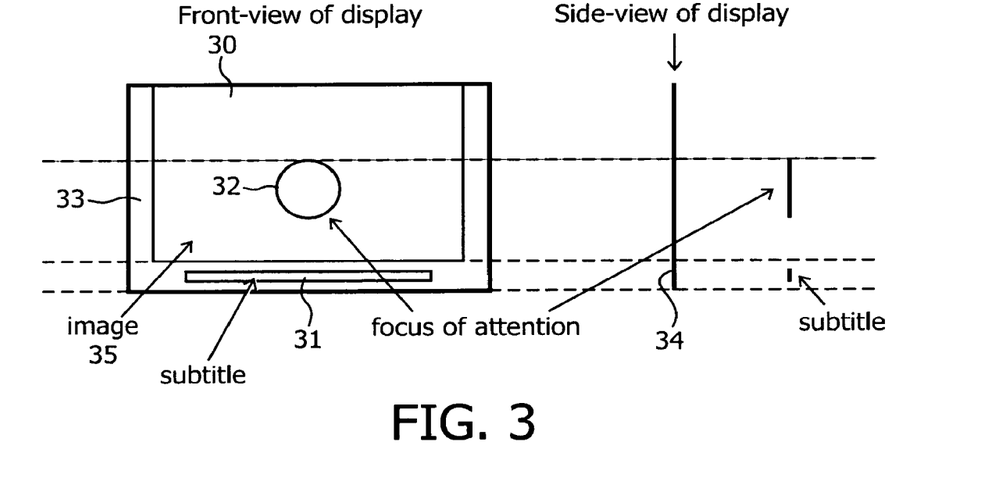
FIG. 3 shows auxiliary graphical data positioned at an auxiliary depth.

FIG. 3 shows auxiliary graphical data positioned at an auxiliary depth. The left part of the Figure shows a 3D display 30 in front view. The right part of the Figure shows the same display in a side view 34. In the Figure, subtitles 31 are placed in a border 33 of the picture outside the image area 35 at a depth that corresponds with the depth of the part of the image that is likely to be at the focus of attention of the viewer.

The area of attention 32 is shown as an object in the center of the image. For detecting the area of attention a number of analysis functions may be applied, in any suitable combination. For detecting the object of attention in the 3D image data the analysis may be based on at least one of the following image processing functions. The image elements that are in focus may be detected, with respect to other image elements that are out of focus. Detecting the local focus of objects is known as such, and may be based on spatial frequency content and other image parameters. For image elements, an amount of additional 3D data may be detected for rendering the image element with respect to the background, such as occlusion data or transparency data. If the 3D video format includes such data, the actual presence of such data for an object indicates that it is to be rendered with high quality in front of a background. For image elements, depth clues may be detected such as differences in movement, depth, luminance and color with respect to the background. Such depth clues are indicative of the attention that the user will pay to the respective object. Specific objects and other predetermined image elements may be recognized and categorized, such as human faces, cars, the ball in a rugby or football game, etc. Also, for image elements, position clues may be detected, such as being located near the center of the display area, and/or having at least a predetermined size relative to the display area.

Figure 4:
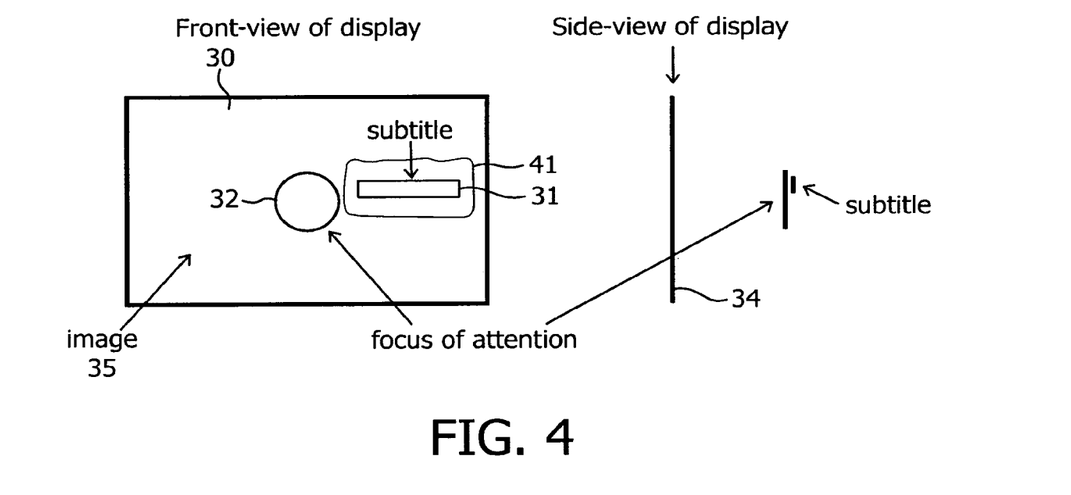
FIG. 4 shows auxiliary graphical data positioned at an auxiliary depth in a target region.

FIG. 4 shows auxiliary graphical data positioned at an auxiliary depth in a target region. The display and subtitle substantially corresponds to FIG. 3. However, the subtitle 31 is now positioned in the same display area 35 that also displays the image data. In the embodiment the subtitles are positioned in the display area 35 by dynamically selecting an x,y position in the display. The position of the auxiliary graphical data is selected in a target region 41. Hence detecting the area of attention now includes selecting a target region for positioning the auxiliary graphical data. The depth pattern is now based on depth values of the target region. The auxiliary depth value may be set in dependence of the depth pattern of the target region. The auxiliary depth value may also be set in dependence of both the object of attention 32 discussed above and the depth pattern of the target region itself.

In an embodiment, depth and/or parallax of subtitles is supplied as meta-data with the video either per frame or per group of frames. The producer of the film or post-production people can produce these meta data by an authoring tool that performs the function of detecting said area of attention in the 3D image data and determining the depth pattern for the area of attention, and setting the auxiliary depth values in dependence of the depth pattern.

It is noted that placing overlays over graphical information dynamically at the nearest depth value for each frame, like in WO2008/115222 leads to frequent depth jumps of the overlays between frames. Placing the overlays at a fixed depth value for multiple frames often leads to overlays which are very close to the viewer as the nearest object of multiple frames determines the overlay placement for all the given frames. Both approaches lead to visual fatigue. Currently detecting the area of attention comprises selecting a target region for positioning the auxiliary graphical data, and the depth pattern is based on depth values of the target region.

In an embodiment selecting the target region is performed as follows. The display area is subdivided in multiple regions. Detecting the depth pattern is based on spatially filtering the depth values of the multiple regions according to a spatial filter function in dependence of the target region.

Figure 5:
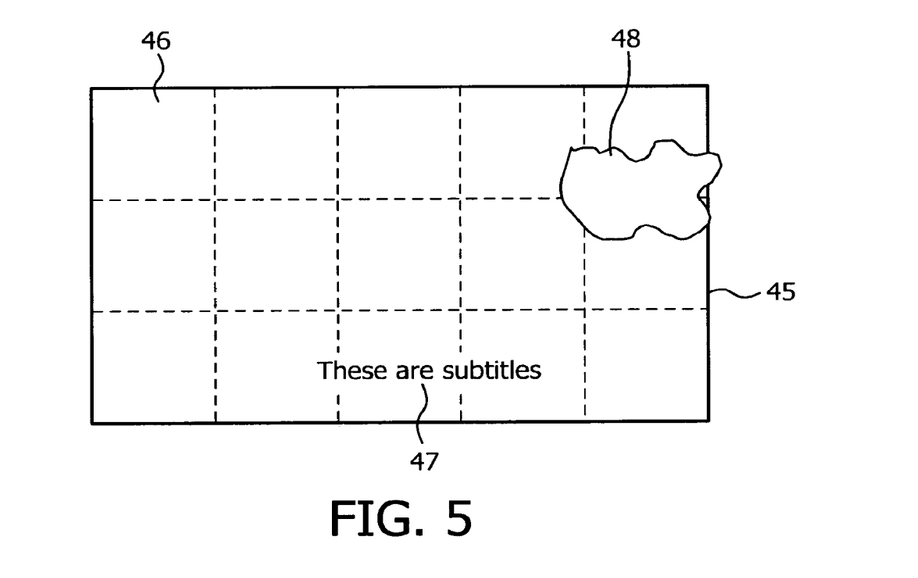
FIG. 5 shows subdividing the display area.

FIG. 5 shows subdividing the display area. The figure shows an example in which a display image 45 is divided in tiles 46. In each tile the maximum depth is computed separately. In the example, the subtitle text 47 can be at a specific depth even if the depth of the other object 48 is significantly larger (i.e. closer to the viewer).

With prior methods, the maximum depth value is computed for a whole image frame, so that a single object with a large depth leads to a placement of the overlay at that large depth, even if both the object and the overlay are in separate regions of the image. With the proposed method, the depth is computed in multiple regions (tiles) of the image. Only the depth in the tiles that are in the proximity of the overlay will influence the depth placement of the overlaid auxiliary graphical data.

In one embodiment, the invention described here is used to overlay subtitles on 3D content. The primary content exists as stereo (left/right) images; the subtitles also exist as images. The embodiment can as well render the subtitles from a suitable description.

The embodiment is using the following steps:

From all left and right images of the video content the disparity is computed for all pixels or only for the region of interest.

Within the region of interest the minimum disparity is computed and stored for each image pair. Disparity is negative for objects that appear in front of the screen, so these values correspond to the objects having the least perceived distance from the viewer.

Filtering is applied to the list of minimum disparities.

Positive depth values are set to 0, which is equivalent to moving all objects which are behind the screen to the screen plane. Another value can be chosen in this step to place the objects on a different plane per default.

The subtitles are blended on top of the left and right images using a pixel displacement between left and right that is equal to the filtered disparity.

If subtitles are pre-rendered, regular alpha blending is used.

If the subtitles exist in textual format, they are rendered with sub-pixel precision.

A small offset (usually one pixel) can be applied to generate a small depth range between the front most object and the subtitles.

It is noted that the above method enables selecting the target region based on selecting, as the target region, a region of the image data where no depth values occur larger than the auxiliary depth values. Moreover, said selecting may include selecting a period in time for displaying the auxiliary data such that, in the target region, no depth values occur larger than the auxiliary depth values. For example, the rendering of the subtitle may be delayed or shifted to allow a more forward object to disappear.

In an embodiment determining the depth pattern includes detecting depth values in multiple frames of video content, and temporally filtering the depth values according to a temporal filter function. For example a period of time may be considered in which the subtitle itself is to be displayed, or a period slightly longer to avoid objects appearing substantially adjacent to, and more forward than, the subtitle. The period of displaying the subtitle is usually indicated in the display signal.

In particular determining the depth pattern may include setting a time window for the temporal filter function based on detecting shot boundaries in the multiple frames of video content. This can be implemented as follows.

From the left or right images the shot boundaries are computed. The start images of shots are found by detecting large changes in the image content, using the color histogram of the image.

The minimum disparity list is detected for the shots according to the shot cuts detected before.

For each shot the minimum disparity list is then filtered with a suitable time window function (example see below). A window function is a function that is zero-valued outside of some chosen interval. For instance, a function that is constant inside the interval and zero elsewhere is called a rectangular window, which describes the shape of its graphical representation. The image signal (data) is multiplied by the window function, and the product is also zero-valued outside the interval.

Filtering each shot separately guarantees that only values from within the shot are used. Thus the depth values of the auxiliary graphical data are allowed to jump at shot cuts if the disparity of the front most object within the region of interest jumps, but it is not allowed to jump within a shot. As an alternative also the depth placement between shots can be filtered allowing for smooth transitions at shot boundaries.

For choosing the window function the embodiment uses a Hann window function but other window functions, e.g. a rectangular window function, are also suitable. The Hann function, named after the Austrian meteorologist Julius von Hann, is a discrete probability mass function given by $$w(n) = 0.5\left(1 - \cos\left(\frac{2\pi n}{N-1}\right)\right)$$

The window is centered at the current position in time, so that both values of the past and future are taken into account. This has the effect of smoothing the values, thus avoiding abrupt changes in the disparity, and of making sure that the overlay is always in front of the 3D content. Future values may not be available, e.g. for real time broadcasts, and windowing may be based on past values only. Alternatively a part of the future frames may be stored in a buffer first while applying a small delay in rendering.

It is noted that the selected target region (TR) must at least cover the bounding rectangle of the subtitle text. For a pleasant visual appearance, the TR should be significantly larger. For subtitle placement at the bottom of an image the embodiment uses a TR that is vertically extending from the bottom of the image to a predetermined height, e.g. quarter to half the height of the image. Horizontally it is centered in the image extending for the width of the subtitle or the image width minus 20%, whatever is larger. This TR guarantees that the depth of the subtitles is adjusted according to the depth of the objects in their proximity. Extending the region to the middle of the image assures that the objects that the viewer is usually focusing on are taken into account. Also spatial filtering may be applied to assign a high weight to object in nearby tiles and a lower weight to forward objects in tiles farther away.

In an embodiment the image data is downscaled to fit in a limited part of the display area. For example the (1:1.85) movie content is downscaled a little on a 16:9 display. For 1:2.35 movie content this would not be needed for subtitles, because a black bar is available at the bottom. Then (downscaled) whole content is shifted upwards and aligned with the top side of the screen. This creates room below of the screen to have a subtitle area where all the subtitles can be put on the auxiliary depth values as derived above.

Figure 6:
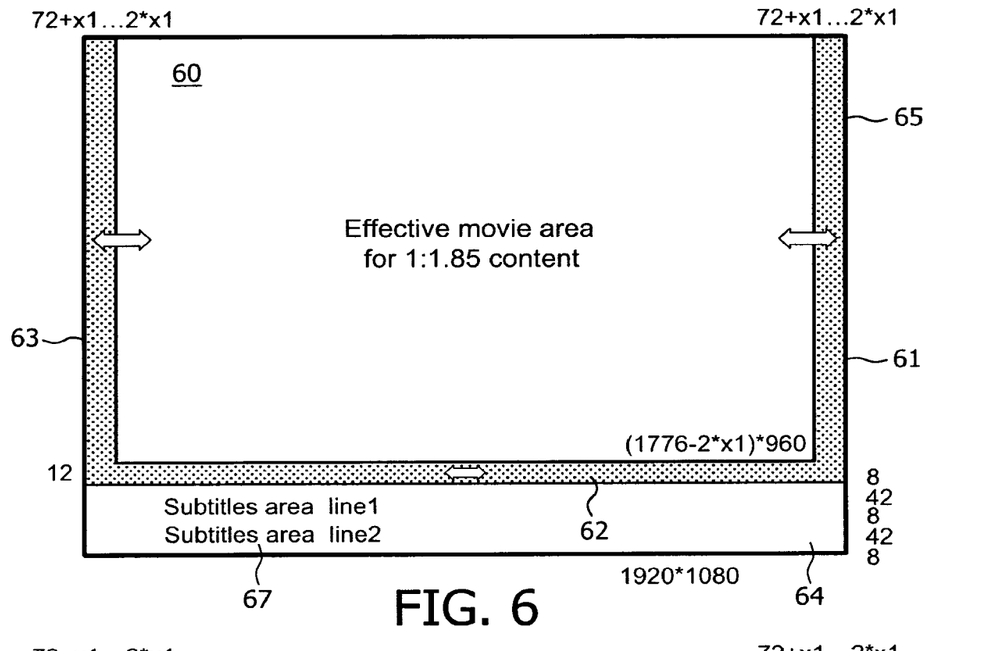
FIG. 6 shows an example of downscaled image data.

FIG. 6 shows an example of downscaled image data. In a display area 65 a left border 63 and a right border 61 and a bottom border 62 are shown around the image area 60. At the bottom area 64 is available for subtitles 67. In the Figure the size of the elements is indicated by the numbers of pixels for a display size of 1920*1080.

For HD video the optimal size of the subtitle font is 42 lines. 1:1.85 movie content shown on a 16:9 display leaves room for 17 lines. Scaling the 1:1.85 to create two rows of subtitles requires 84 lines with some black lines in between this means we need approximately 100 lines this requires a scaling factor of about 90%. Typically this will not be very noticeable to the user especially if the border is textured to look like the edge of the display. In addition most current platforms can support arbitrary scaling factors. Alternatively the scaling of the movie area can already be done at the authoring side (at the expense of slightly less resolution for mono).

It is noted that, in 3D video rendering, another serious issue is the border effect. The border effect occurs with objects with depths in front of the screen that appear not completely in the frame of the display but at the boundary side. The border effect causes in the human brain conflicts resulting in fatigue as well. A solution for the border effect is to create an artificial left & right border (using 2 small vertical bars) which dynamically can be adjusted in the depth direction in such way that the adjacent border of a cut object is always closer to the viewer then the cut object. Like subtitles, border depth can also be adjusted dynamically based on content depth/disparity.

In FIG. 6, said downscaling of the image area allows to apply the vertical borders 61,63 to accommodate for the border effect. The downscaling gives room for 2 small vertical borders of about 85 rows each, they can be used for dynamically changing depths of the black bars (borders) in order to avoid the border effect.

Since room has been created for subtitles there is the option to dynamically depth adjust the bottom edge of the content. However this is more difficult than for left and right borders. Horizontally shifting the bottom bar may work depending on the amount of texture. However, displacing a constant signal (black bar) does not have any effect. There will not be a border violation problem at the bottom of the screen with a constant black bar. However when this bar is not just black but somehow textured (e.g. wooden look like in FIG. 6) it becomes also possible to depth adjust the bottom border in front of the cut object.

A further advantage of the artificial (out of the screen) borders is that they also allow an easy and practical way for the viewer to put himself in the center of the cone for viewing.

Figure 7:
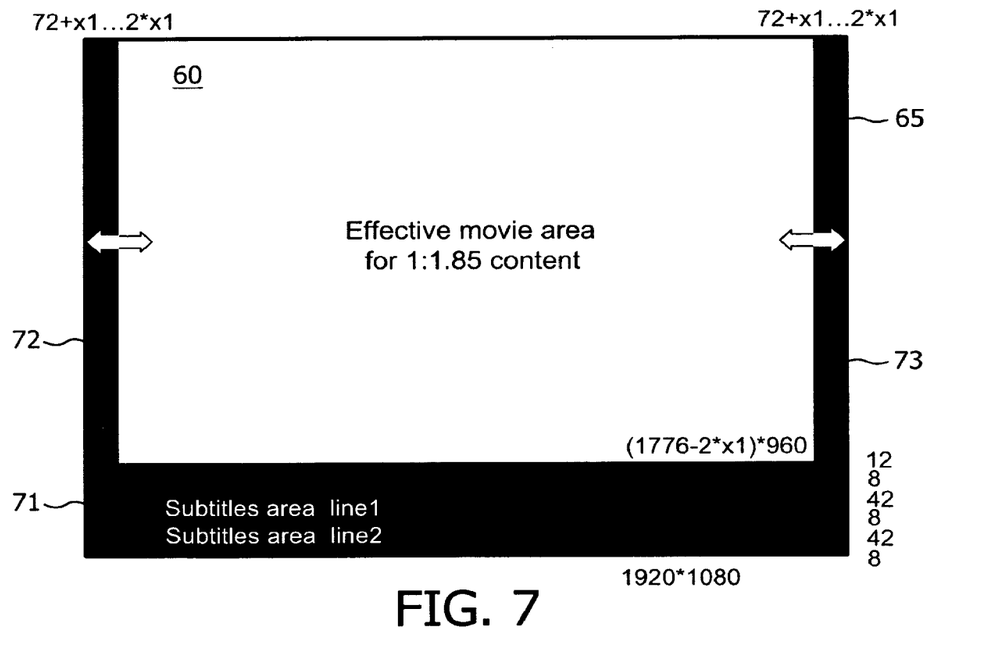
FIG. 7 shows an example of downscaled image data in black borders.

FIG. 7 shows an example of downscaled image data in black borders. In a display area 65 a left border 72 and a right border 73 and a bottom border 71 are shown around the image area 60. The bottom border 71 is available for subtitles. In the Figure the size of the elements is indicated by the numbers of pixels for a display size of 1920*1080. For a different screen size, such as 1280*720, similar arrangements can be made.

Figure 8A:
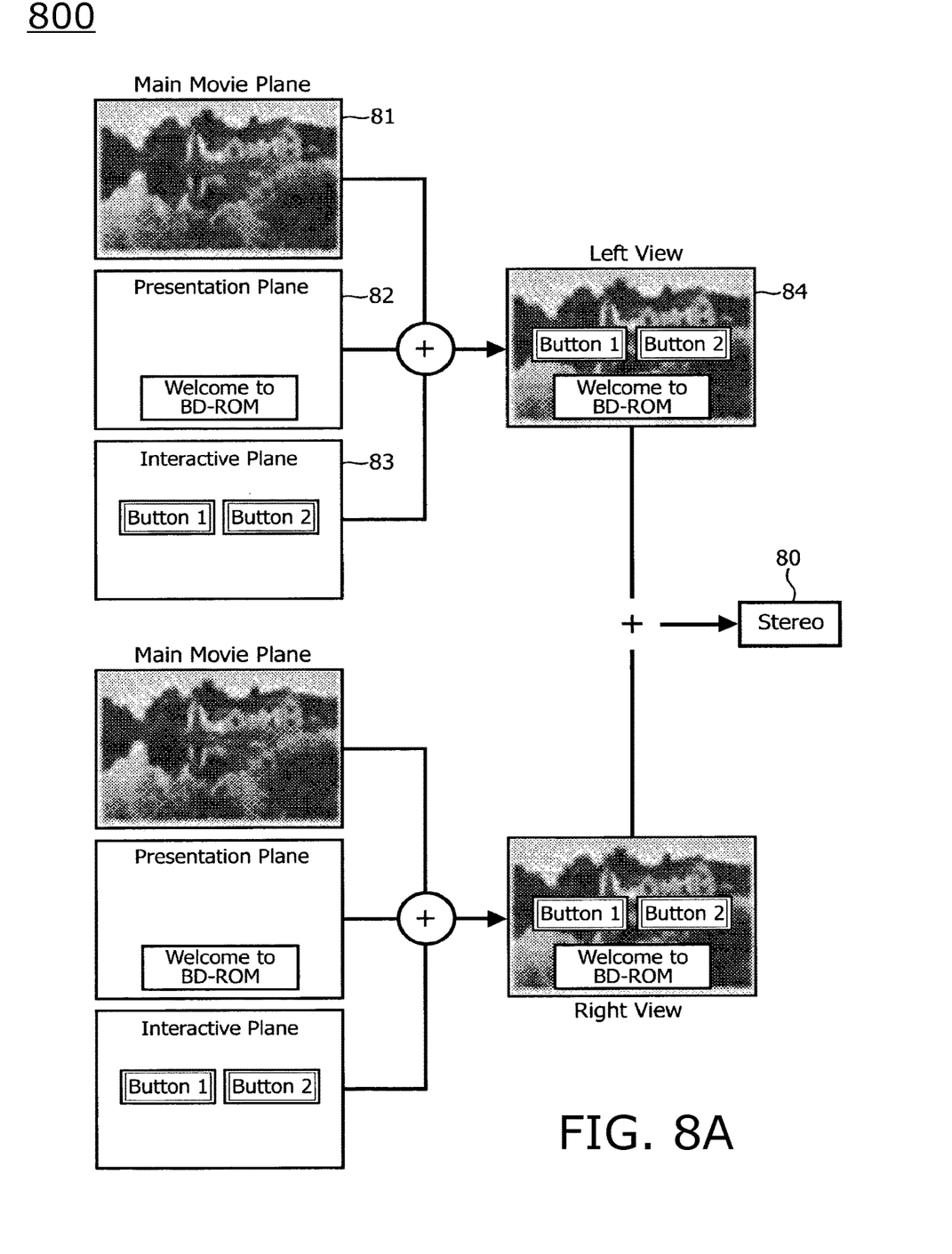
FIG. 8A shows an overlay of subtitles and graphics on video.
Figure 11:
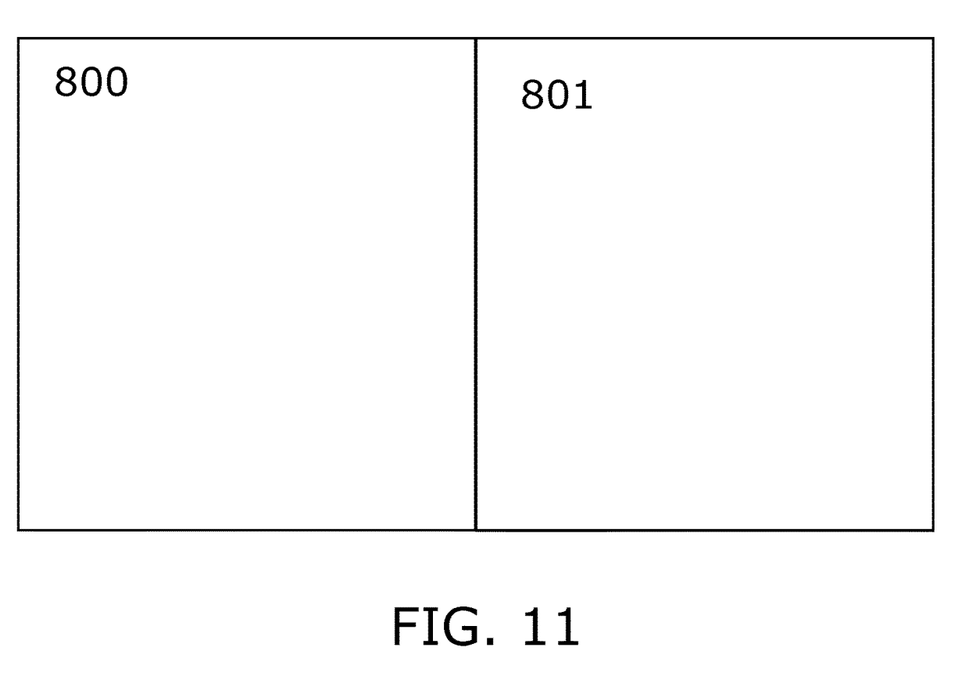
FIG. 11 shows an overlay of subtitles and graphics on video.

FIG. 11 shows an overlay of subtitles and graphics on video. The left part of FIG. 11, 800 shows an example for stereoscopic video output 80 having a left view 84 and right view, as shown in detail in FIG. 8A. Both views are generated based on overlaying an 3D image 81, and a first layer 82, Presentation Plane, and a second layer 83, Interactive Plane, of auxiliary graphical data. The auxiliary depth values for the graphical elements are determined as discussed above.

Figure 8B:
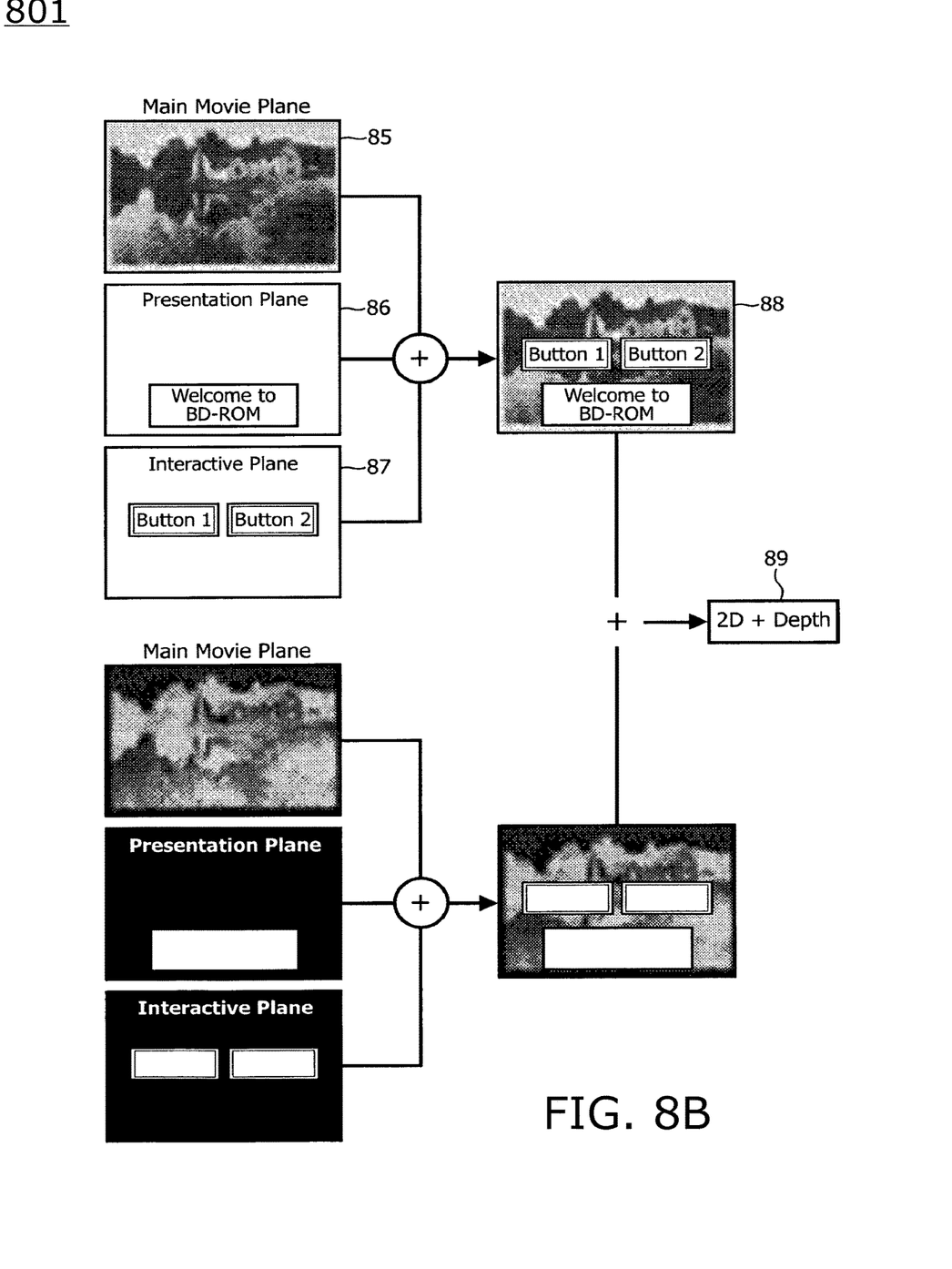
FIG. 8B shows an overlay of subtitles and graphics on video.

The right side of FIG. 11, 801 shows a similar example for a two dimensional (2D)+depth video output 89, having a 2D view 84 and right view, as shown in detail in FIG. 8B. Both views are generated based on overlaying a 2D image 85, and a first layer 86, Presentation Plane, and a second layer 87, Interactive Plane, of auxiliary graphical data; said layers each having a corresponding depth map. The auxiliary depth values for the graphical elements are determined as discussed above and applied to adjust said depth maps.

It is noted that the model in FIG. 11 may be implemented on the Blu-ray Disc (BD) format extended to allow control of the size and position of the borders as shown in FIGS. 6 and 7 and the position and size of the subtitle area. The BD format supports multiple planes that allow a content author to control the overlay of graphics on top of video. The implementation is as follows.

In a first step the video is scaled to make room for the subtitles, e.g. for at least two lines of subtitles. The scaling factor may be under control of the content author. Therefore the BD spec should be extended to allow arbitrary scaling factors of the video. At least a scaling factor of 7/8 should be supported.

In a second step a texture is loaded in a memory buffer. This texture is used to fill the side borders that will be used to create a sliding window as shown in FIG. 6 (not required for black borders in FIG. 7).

In a third step, during playback, the size of the side borders for the left and right view in case of stereo video are adjusted such that the disparity of the side borders is larger than the disparity of the cut-off objects. For 2D image+depth video the depth of the borders is adjusted to be larger than the depth of any cut-off objects. In addition for 2D image+depth the background of the video that is occluded by the border is copied into the occlusion background data layer of the output format.

For implementation into an existing video format it requires that the format is extended with a scaling factor of at least 7/8 for the video at 1920×1080 resulting in a target resolution of 1680×945. The above steps can be implemented by an authoring tool by using the presentation graphics plane. The presentation graphics then not only contains the subtitles but also the borders for the sliding window as is shown in the figure below.

Figure 9:
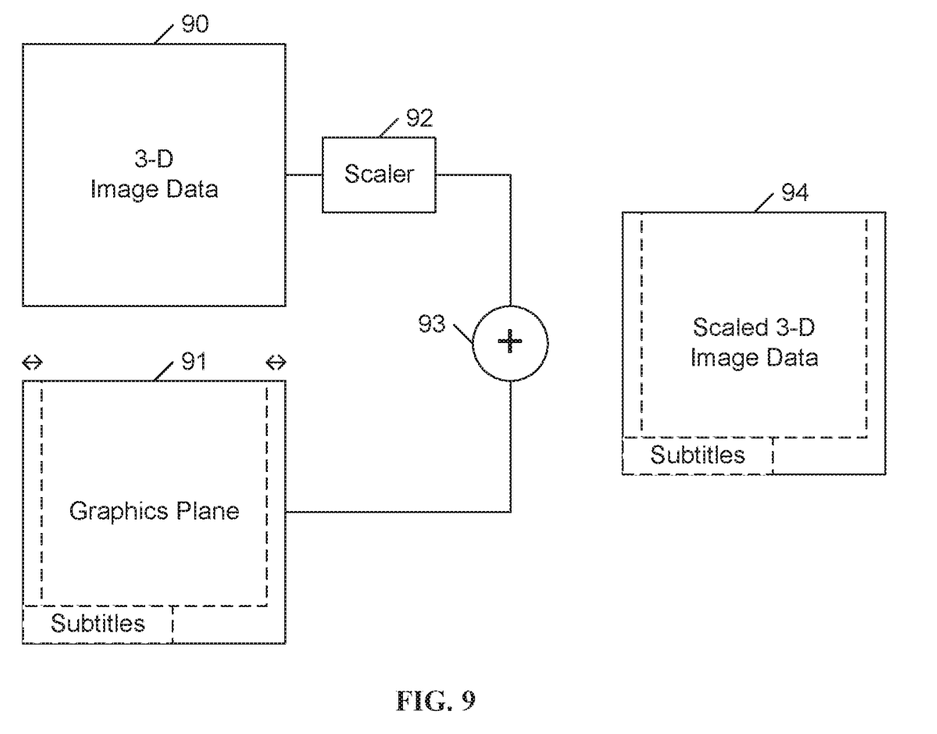
FIG. 9 shows scaling the video to make room for subtitles and floating windows.

FIG. 9 shows scaling the video to make room for subtitles and floating windows. A 3D image data 90, e.g. a main movie, is entered in a scaling unit 92. A presentation graphics plane 91 is provided, having the left/right borders and the bottom area for subtitles as described above. The scaled video is combined in combiner 93 to provide the 3D image data 94. The window that shows the 3D image data is called floating because the left and right borders, and optionally the bottom border, are adjusted in depth to accommodate the border effect. By the process the target region for the auxiliary graphical data is selected to be an area of the display where no image data is displayed, and accordingly reducing the size of the image data to fit in the remaining display area. Note that for a main movie that is wide enough (e.g. 2.20:1) it is sufficient to shift the video upwards or downwards to create a black bar and forego the step of scaling the video.

Figure 10:
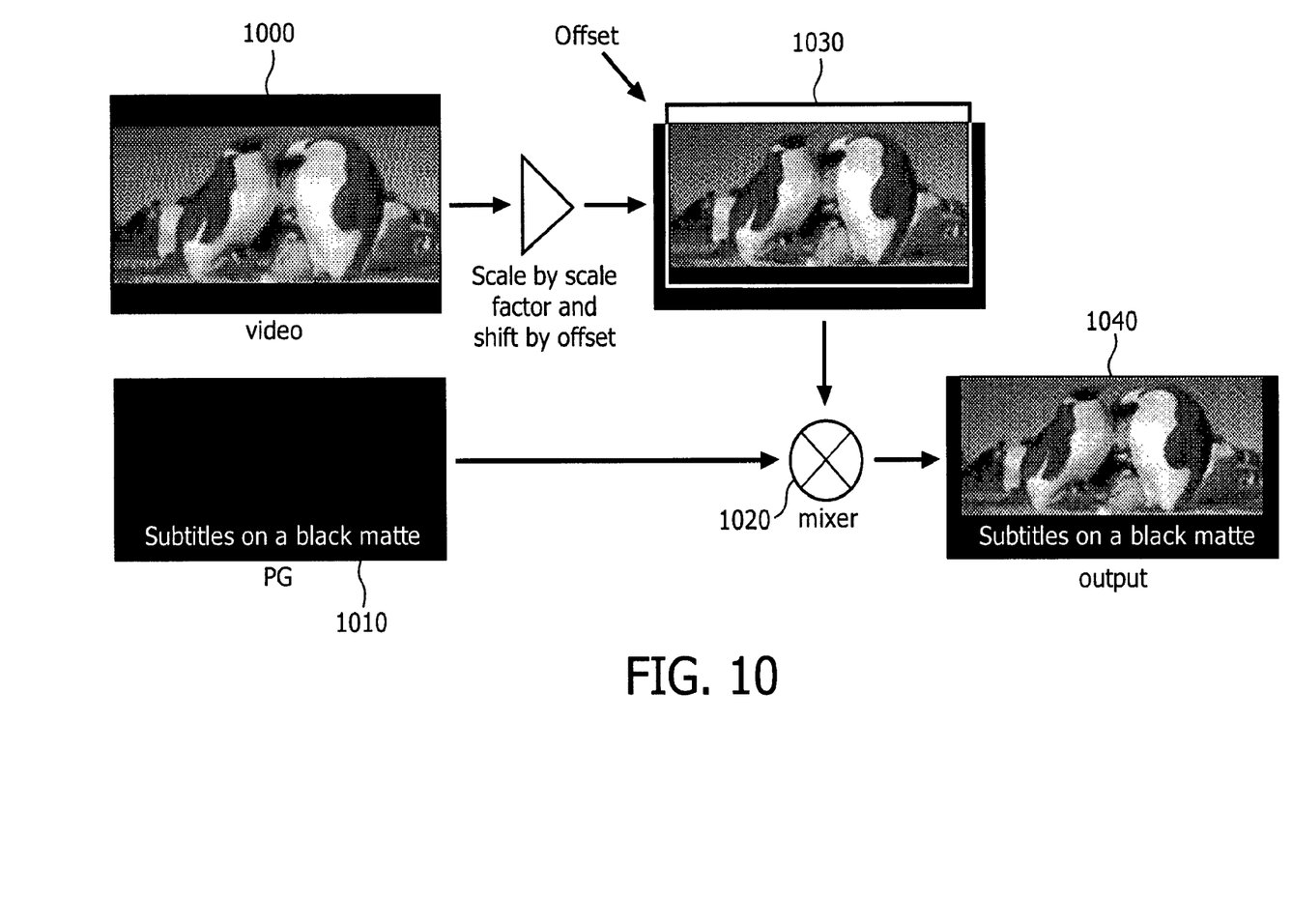
FIG. 10 shows a combined scaling and shifting of the video in order to accommodate subtitles.

FIG. 10 shows a further example of scaling and offset (1030) of a primary video stream (1000) top left corner, with subtitles on a matte black background (1010) bottom left corner which are subsequently combined using a mixer (1020) into a combined output signal (1040).

When the main movie is transmitted to the player by means of a stream or by means of a physical medium such as a disc having a disc format such as Blu-ray Disc (BD), the scale information and/or shift (offset) information need to be supplied on the medium.

As indicated hereinabove and herebelow, the scale information and shift information preferably are a scale factor for both x and y scaling and an offset, in either x or y direction.

Advantageously the scale and/or shift information is stored in a table that lists the streams (overlays representing subtitles in different languages) playable during parts of the main movie. This table is similar to the Program Map Table as defined in IOS13818-1 "Information Technology-Generic Coding of Moving Pictures and Associated Audio Information—Part 1: Systems"; hereby incorporated by reference.

In the BD format a similar table is called the STN_table. Entries for every stream can be added to provide different offset and scaling per PG (Presentation Graphics) or Text subtitle stream, see for example http://www.blu-raydisc.com/Assets/Dowmloadablefile/2b_bdrom_audiovisualapplication_0305-12955-15269.pdf for more information on the Blu-ray Disc format, hereby incorporated by reference.

Alternatively, the scaling and/or shift information are stored in any of or any combination of or in all of the following locations:

In the extension data of the PlayList whereby the PlayList is a database on the disc of that carries all the information necessary to decode and play back sequences of audiovisual content as selected by the user from a menu. Preferably the scale factor and/or offset information is stored together with the subtitle-disparity information. Alternatively the scale factor and/or offset information is stored in a new entry in the Playlist ExtensionData( ) contains aforementioned offset and scale factor.

In the overlay graphics stream itself (e.g. subtitles Presentation Graphics and/or text-subtitle stream).

More alternatively, the shift and/or scale information are provide by other means e.g. the shift and scale factor can be determined by an application (BD-Java or Movie Object) stored on the disc and executed by the disc player which writes these numbers to a Player Status Register (PSR); the player's decoding and rendering engine reads values from the PSR and applies the shift and/or scale factor to the main movie as shown in FIG. 9.

There are many ways to represent the shift and scale information in a mathematically equivalent way, e.g. by specifying the size and/or location of the active video (the part of the unscaled image excluding the black bars) and the size and/or/location of the graphical overlay. The different representations of shift and/or scale factor embody different trade-offs between the complexity of the processing in the player vs. authoring. Moreover, different representations can be advantageous for enabling features like allowing user to select the location of the subtitles and the black bar (top-aligned or bottom-aligned).

Furthermore, as some Asian movies require subtitles that are oriented vertically, it is necessary that black bars on the side (72,73) can also be created or enlarged. The aforementioned steps can also applied in this case when the vertical shift is augmented by a horizontal shift, or where the vertical shift is used instead of a horizontal shift.

To ensure that scaling and shifting of the main video is only enabled for the player when allowed by the content author, the presence of an allowed scaling/shifting is signaled by information in the stream, on the disc, or on the local storage, preferably for every overlay graphics stream on the disc separately. An example where scaling and shifting may be prohibited is close captioning for the hearing impaired where a text balloon "Slam!" only makes sense when overlayed on the video, juxtaposed to the applicable character.

It is to be noted that the invention may be implemented in hardware and/or software, using programmable components. A method for implementing the invention has the processing steps corresponding to the processing of 3D image data elucidated with reference to FIG. 1. Although the invention has been mainly explained by embodiments using optical record carriers or the internet, the invention is also suitable for any image interfacing environment, like a 3D personal computer [PC] display interface, or 3D media center PC coupled to a wireless 3D display device.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and lies in each and every novel feature or combination of features described above.

The invention claimed is:

1. A method of combining three dimensional image data and auxiliary graphical data on an image processing device, the method comprising:
   obtaining the three dimensional image data from an information carrier;
   combining the three dimensional image data and auxiliary graphical data on a display plane;
   obtaining shifting information from the information carrier; and
   shifting the three dimensional image data based on the shifting information,
   wherein the shifting creates a black bar spatial area which is not occupied by the shifted three dimensional image data,
   wherein the black bar spatial area is created in an area of the display plane where no image data is displayed,
   wherein the shifting information comprises information signaling the presence of an allowed shifting for enabling the shifting of the three dimensional image data,
   wherein the shifting information comprises an offset in at least one of a horizontal direction of the display plane and a vertical direction of the display plane,
   wherein the offset is a uniform shift of an image wherein all points in the image are displaced by a value of the offset, and
   wherein the method further includes:
      determining a depth of a focus of attention in the three dimensional image data by analyzing content of the three dimensional image data, and
      rendering the auxiliary graphical data in the black bar spatial area at a determined depth that is based on the depth of the focus of attention.

2. The method of claim 1, wherein the auxiliary graphical data is at least one of, two dimensional subtitle information, two dimensional subpicture information, three dimensional subtitle information or three dimensional subpicture information.

3. The method of claim 1, wherein the auxiliary graphical data is rendered in the black bar spatial area at the depth of the focus of attention.

4. The method of claim 1 wherein the auxiliary graphical data disposed within the black bar spatial area is padded with black background information.

5. The method as claimed in claim 1,
   wherein the shifting information comprises information for arranging the location of subtitles and the black bar spatial area,
   wherein the subtitles and the black bar spatial area is arranged to be top-aligned, and wherein the black bar is disposed at the top of the display plane.

6. The method as claimed in claim 1,
wherein the shifting information comprises information for arranging the location of subtitles and the black bar spatial area,
wherein the subtitles and the black bar spatial area is arranged to be bottom-aligned, and
wherein the black bar is disposed at the bottom of the display plane.

7. A source device for combining three dimensional image data and auxiliary graphical data, the source device comprising:
a processor circuit arranged to obtain the three dimensional image data and shifting information from an information carrier;
wherein the processor circuit combines the three dimensional image data and auxiliary graphical data on a display plane,
wherein the processor circuit is arranged to shift the three dimensional image data to create a black bar spatial area which is not occupied by the shifted three dimensional image data,
wherein the shifting information comprises information signaling the presence of an allowed shifting of the three dimensional image data,
wherein the shifting of the three dimensional image data is based on the shifting information,
wherein the image data is arranged to fit in the area not occupied by the black bar spatial area,
wherein an overlaying of the three dimensional image data and auxiliary graphical data is arranged such that the auxiliary graphical data is placed within the black bar spatial area,
wherein the shifting information comprises an offset in at least one of a horizontal direction of the display plane and a vertical direction of the display plane,
wherein the offset is a uniform shift of an image wherein all points in the image are displaced by a value of the offset,
wherein the processor circuit is arranged to determine a depth of a focus of attention in the three dimensional image data by analyzing content of the three dimensional image data, and
wherein the processor circuit is arranged to place the auxiliary graphical data in the black bar spatial area at a determined depth that is based on the depth of the focus of attention.

8. A source device as claimed in claim 7,
wherein the source device comprises an optical disc unit for retrieving various types of image information from the information carrier,
wherein the optical disc unit comprises circuit for obtaining the shifting information from the information carrier as claimed.

9. A three dimensional display device for combining three dimensional image data and auxiliary graphical data, the three dimensional display device comprising:
a display plane; and
a processor circuit arranged to obtain the three dimensional image data, from an information carrier using a source device;
wherein the processor circuit combines the three dimensional image data and auxiliary graphical data on the display plane,
wherein the processor circuit is arranged to obtain shifting information from the information carrier using a source device,
wherein the processor circuit is arranged to shift the three dimensional image data to create a black bar spatial area that is not occupied by the shifted three dimensional image data,
wherein the shifting information comprises information signaling the presence of an allowed shifting of the three dimensional image data,
wherein the shifting of the three dimensional image data is based on the shifting information,
wherein the image data is arranged to fit in an area not occupied by the black bar spatial area,
wherein an overlaying of the three dimensional image data and auxiliary graphical data is arranged such that the auxiliary graphical data is placed within the black bar spatial area,
wherein the shifting information comprises an offset in at least one of a horizontal direction of the display plane and a vertical direction of the display plane,
wherein the offset is a uniform shift of an image wherein all points in the image are displaced by a value of the offset,
wherein the processor circuit is arranged to determine a depth of a focus of attention in the three dimensional image data by analyzing content of the three dimensional image data, and
wherein the processor circuit is arranged to place the auxiliary graphical data in the black bar spatial area at a determined depth that is based on the depth of the focus of attention.

10. The three dimensional display device of claim 9, wherein the determined depth corresponds to the depth of the focus of attention.

11. The source device of claim 7, wherein the determined depth corresponds to the depth of the focus of attention.

\* \* \* \* \*